United States Patent [19]

Scribner

[11] Patent Number: 5,265,326
[45] Date of Patent: Nov. 30, 1993

[54] WIRE INSERTION HAND TOOL FOR THE INSERTION OF WIRES, OR SIMILAR STRAND-LIKE MATERIAL, WITHIN A WIRE CONTAINING DUCT

[76] Inventor: Herbert H. Scribner, Rte. 126 - HC71, Box 16, Strafford, N.H. 03815

[21] Appl. No.: 760,321

[22] Filed: Nov. 20, 1991

[51] Int. Cl.$^5$ ............................................. B23P 19/00
[52] U.S. Cl. ........................................ 29/758; 29/278; 81/488
[58] Field of Search ................ 29/243.56, 228, 229, 29/758, 764, 278; 81/488; 294/12, 14, 23.5, 26, 55.5

[56] References Cited

U.S. PATENT DOCUMENTS

| | | | |
|---|---|---|---|
| 73,331 | 1/1868 | Holly | 294/23.5 |
| D. 256,442 | 8/1980 | Martin | 254/25 |
| 2,394,562 | 2/1946 | Plumley | 29/278 |
| 3,013,929 | 12/1961 | Reiling | 81/488 |
| 3,110,093 | 11/1963 | Johnson | 29/764 |
| 3,259,967 | 7/1966 | Marsicano | 29/402.08 |
| 4,075,750 | 2/1978 | Collumber | 29/278 |

FOREIGN PATENT DOCUMENTS 11776  10/1902  Norway ................ 294/14

*Primary Examiner*—P. W. Echols
*Attorney, Agent, or Firm*—Frederick R. Cantor

[57] ABSTRACT

A wire insertion hand tool for the ready insertion of wires, or other strand-like materials, within flexible, elongated, longitudinally-slotted wire-containing ducts, such as a flexible electrical conduit, is described. The hand tool comprises a handle region, an elongated shank region, and a semi-circular, yoke-like, head region. The elongated shank region has smooth contours and terminates in an integral head region. The integral head region has two tine-like outward projections comprising a semi-circular, yoke-like, configuration, also having smooth contours. In operation, single or multiple strands of wire, or a similar strand-like material, are captured within the confines of the yoke-like head region, and are readily inserted at any desired point along the length of a flexible, elongated slotted duct. There is no need for a specific starting or stopping insertion point, in order to perform the wire insertion. The wire insertion hand tool may also be moved in either a forward direction, i.e., pushed, or in a backward direction, i.e., pulled, relative to the position of the operator. The wire insertion hand tool is highly versatile, and can also be employed with a plurality of ducts, each having different wiring requirements, since the tool is not designed to be physically coupled to a single bulk source of wires. The wire insertion hand tool is particularly well-suited for wiring flexible, elongated electrical conduit used in the electrical systems of motor-vehicles, or the like.

1 Claim, 1 Drawing Sheet

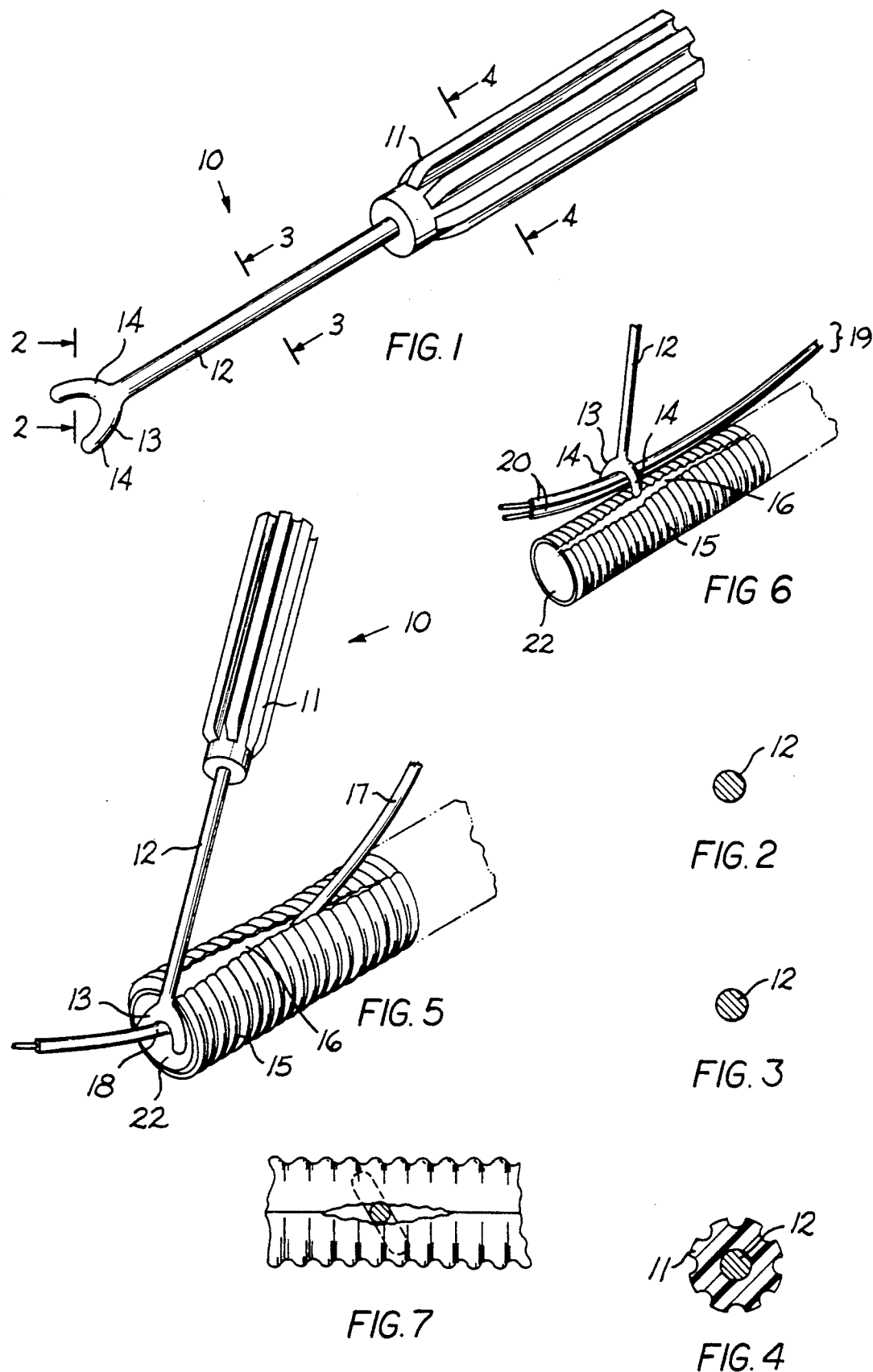

WIRE INSERTION HAND TOOL FOR THE INSERTION OF WIRES, OR SIMILAR STRAND-LIKE MATERIAL, WITHIN A WIRE CONTAINING DUCT

BACKGROUND OF THE INVENTION

The present invention relates to wire insertion hand tools.

The present invention further relates to a wire insertion hand tool, designed for the ready insertion of wires, or other strand-like materials, within flexible, elongated, longitudinally-slotted wire-containing ducts.

The present invention more particularly relates to a wire insertion hand tool, applicable for wiring flexible, elongated electrical conduits, as found in the electrical systems of motor-vehicles. This is accomplished by providing a novel wire insertion hand tool for the ready insertion of wires within flexible, elongated, longitudinally-slotted wire-containing ducts.

The present invention further relates to a wire insertion hand tool for the ready insertion of wires within flexible, elongated, longitudinally-slotted wire-containing ducts, which is uniquely configured with an integral, semi-circular, yoke-like, head region, that serves to: (a) capture the wires in preparation for their ready insertion within the flexible slotted duct; (b) part the duct's slot for acceptance of the wires thereby facilitating wire insertion; (c) while also allowing ready removal of the yoke-like head region from the interior of the duct, without inadvertent release of the successfully inserted wires.

The present invention further relates to a wire insertion hand tool for the ready insertion of wires within flexible, elongated, longitudinally-slotted wire-containing ducts, which provides the operator with a novel means by which wires may be inserted at any desired point along a length of flexible slotted duct, or at any of its open ends.

The present invention also relates to a wire insertion hand tool, for the ready insertion of wires within a flexible, elongated, longitudinally-slotted wire-containing ducts which is versatile, being readily adapted for use with all such ducts, i.e. a tool which is not physically dedicated, or coupled, to a single source of bulk wires. These features allow the operator to be able to work on a plurality of independently configured ducts, as well as utilize an unlimited number of styles and sources of wire.

The present invention also relates to a wire insertion hand tool, for the ready insertion of wires within flexible, elongated, longitudinally-slotted ducts, which is operable with one-hand, and, additionally, may also be equipped with telescoping extension capabilities. These aforementioned two features, providing for ready ease of tool use, as well as ready access to remote segments of the duct.

Several types of conventional tools are known which may be used to insert strip-like flexible materials into specific and matching gaskets or moldings.

Unfortunately, such conventional insertion tools have limited utility when compared to the present invention. For example, conventional tools are limited for use with a single type of strip because they are designed for performing insertions within a matching, companion-type gasket or molding. This is not a drawback of the present invention. The semi-circular, yoke-like, head region, of the present invention, can accommodate numerous configurations of wire, strip- or strand-like materials, and can be readily used to insert such materials into numerous configurations and styles of flexible, longitudinally-slotted ducts, designed to carry wires, or the like.

Additionally, the conventional insertion tools require a specific starting or stopping point along the length of their matching gasket, or molding, in order to accomplish wire insertion or installation. Again, this is not a drawback or limitation of the present invention. The head region of the tool of the present invention, may be readily inserted and removed, wherever desired, at any point along a length of flexible, elongated, longitudinally-slotted duct.

Of great importance to the utility of the present invention is the fact that it is highly versatile. Unlike other conventional insertion tools, the present invention is not dedicated to, nor encumbered by, a single type or supply of bulk wires, or other stand-like materials. This feature allows the present invention to versatilely accommodate multiple sources, types, or supply, of wire or other strand-like materials, as well as accommodate a plurality of different style independent ducts. This feature significantly increases the tool's efficiency and utility, relative to conventional insertion tools.

Furthermore, unlike conventional insertion tools, the optional telescoping, or extending, shank region, of the alternate embodiment of the present invention, provides increased utility by enabling the operator to readily perform wire insertions at remote sites, which would otherwise be inaccessible and/or inconvenient to service with a non-telescoping tool. A common limitation of conventional insertion tools is their inability to perform beyond the physical reach of the operator.

SUMMARY OF THE INVENTION

It is an object of the present invention to provide a wire insertion hand tool, designed for the ready insertion of wires, or other strand-like materials, within flexible, elongated, longitudinally-slotted wire-containing ducts.

It is a further object of the present invention to provide a wire insertion hand tool, which more particularly relates to wiring flexible, elongated electrical conduits, as found in the electrical systems of motor-vehicles, by providing a novel means for the ready insertion of wires within flexible, elongated, longitudinally-slotted wire-containing ducts.

It is yet a further object of the present invention to provide a wire insertion hand tool for the ready insertion of wires within flexible, elongated, longitudinally-slotted wire-containing ducts, which is uniquely configured with an integral, semi-circular, yoke-like, head region that serves to (a) capture the wires in preparation for their ready insertion within the duct, (b) part the duct's slot for acceptance of the wires thereby facilitating wire insertion, while (c) also allowing ready removal of the yoke-like head region from the interior of the duct, without inadvertent release of the successfully inserted wires.

It is yet a further objective of the present invention to provide a wire insertion hand tool for the ready insertion of wires within flexible, elongated, longitudinally-slotted wire-containing ducts, which provides the operator with a novel means by which wires may be inserted at any desired point along a length of slotted duct, or at any of its open ends.

It is yet a further objective of the present invention to provide a wire insertion hand tool for the ready insertion of wires within flexible, elongated, longitudinally-slotted wire-containing ducts, which is versatile, being readily adapted for use with all such ducts, i.e. a tool which is not physically dedicated, or coupled, to a single source of bulk wires. These features allow the operator to be able to work on a plurality of independently configured ducts, as well as utilize an unlimited number of styles and sources of wires.

It is still yet a further object of the present invention to provide a wire insertion hand tool, for the ready insertion of wires within a flexible, elongated, longitudinally-slotted wire-containing ducts, which is operable with one hand and may also be equipped with telescoping extension capabilities. These aforementioned two features providing for ready ease of use, and ready access to remote segments of a duct.

In accordance with the foregoing objects of the present invention, the following is a brief description of the preferred embodiments of the present invention.

In its preferred embodiment, the present invention comprises a wire insertion hand tool for the ready insertion of wires, or other strand-like materials, within a flexible, elongated, longitudinally-slotted wire-containing ducts, such as flexible electrical conduit, comprising a handle region, an elongated shank region and a semi-circular, yoke-like, head region.

The elongated, narrow, linear shank has a smooth contour and may preferably have a circular, air-foil or elliptical cross-section. The thin shank is connected to, or mounted to, and extends outwardly from, the thicker handle region. Although the preferred embodiment of the present invention is depicted herein as having a rounded, grooved handle region, it will be obvious to those skilled in the art that other configurations may be suitable.

The elongated, narrow shank region terminates in an integral head region, which has two tine-like outward projections comprising a semi-circular, yoke-like, configuration. The head region and its integral projections have a smooth contour, and may be circular, air-foil or elliptical in cross-section, and may be of similar or different cross-sectional configuration.

Importantly, all the operative leading-edge surfaces of the present invention, including the tine-like projections of the yoke-like head region as well as the shank region, may be of circular, air-foil or elliptical cross-section or, of other smooth curvature in the leading direction. Specifically, the leading-edge side of the tool comprises those surfaces which, in operation, bear against both the wires, and flexible slotted duct, thereby readily parting the longitudinal slot within the flexible duct. Thus, the leading-edge curvature of the surfaces of the preferred embodiment of the present invention may be either rounded, air-foil, elliptical, or other desired shapes.

Moreover, any possible resemblance between the semi-circular-shaped yoke-like head region of the present invention, and the head of an open-ended wrench, is strictly superficial and non-functional. The present invention differs in at least two important respects: First as noted above, all of the surfaces of the head region, including its integral tine-like projections, as well as those of the shank region, are formed with smooth curves in cross-section, particularly on the leading sides or leading surfaces. According to the specifications of the preferred embodiment of the present invention, the projections of the head region, as well as the shank region, can be either circular, air-foil, or elliptical in cross-section. Thus, in this first respect, the head region of the preferred embodiment of the present invention can not form an open-ended wrench termination.

Second, the projections of the head region extend outwardly, to form a semi-circular termination, and do not turn back to form the parallel engaging surfaces required for an open-ended wrench head. Thus, in keeping with its unique physical configuration, the function of the tine-like projections of the head region of the preferred embodiment of the present invention is for readily inserting wires by spreading a flexible slotted duct, and guiding the wires during insertion within the flexible slotted duct. Such is obviously not the case with regard to the form-function relationship, and its gripping, turning and twisting function, associated with an open-ended wrench.

In operation, a single wire or a plurality of two or more wires, is captured or enclosed within the confines of the tine-like projections of the semi-circular, yoke-like, head region. The novel configuration of the head region of the present invention allows wires to be inserted at any desired locale along a length of flexible, elongated slotted ducts. Uniquely, there is no requirement for a specific starting or stopping point to accomplish insertion, since the head region of the wire insertion hand tool may be readily inserted, and readily removed repeatedly, anywhere along the length of one slotted duct.

The wire insertion hand tool of the present invention may also be used to readily insert wires in a continuous fashion along an extended length of flexible, elongated slotted duct, and may be moved in either a forward or a backward direction.

The wire insertion hand tool of the present invention is highly versatile, and may also be used to accommodate a range of different ducts, since the tool is not dedicated to, or otherwise encumbered by, a single bulk source of wires.

The wire insertion hand tool of the present invention is particularly well-suited for wiring flexible, elongated electrical conduit found in the electrical systems of motor-vehicles.

In an alternate preferred embodiment of the present invention, the elongated shank region may be telescopic, so as to be adjustable in length, thereby providing increased utility by enabling the operator to perform ready insertions of wires at remote sites which would otherwise be inaccessible and/or inconvenient to reach with a non-telescoping tool.

In summary, the present invention further encompasses the following preferred embodiments:

1. A wire insertion hand tool, suitable for the ready insertion of single and multiple wires, or the like, strand-like or strip-like material, or the like, within a flexible, elongated, longitudinally-slotted wire-containing duct, comprising: a handle region; a shank region; said handle region being connected to, and contiguous with, said shank region; a head region; said shank region terminating in a substantially semi-circular-shaped said head region; and said head region further comprising a means for capturing and inserting said wires within said wire-containing duct.

2. A wire insertion hand tool, as described in paragraph above, further comprising: said shank region, having smooth contours on all its operative leading-edge surfaces; said shank region further comprising an elongated, linear shank, having a cross-sectional dimension thinner than that of said handle region; and said shank region being connected to and extending outwardly from said handle region.

3. A wire insertion hand tool, as described in paragraph 1 above, further comprising said shank region incorporating a telescoping extending means.

4. A wire insertion hand tool, as described in paragraph 1 above, further comprising: said head region having smooth contours on all its operative leading-edge surfaces; said head region further comprising tine-like projections which extend outwardly to form a termination having a substantially semi-circular yoke-like configuration.

5. A wire insertion hand tool, as described in paragraph 1 above, further comprising: said shank region and said head region, having leading-edge cross-sectional curvatures, selected from the group consisting of circular, air-foil and elliptical shapes.

6. A wire insertion hand tool, as described in paragraph 4 above, wherein said head region, further comprises: a means for capturing wires within the confines of said projections; a means for parting said flexible duct's longitudinal slot; a means for spreading said flexible slotted duct, in preparation for the insertion into said duct of said captured wires; and a means for facilitating ready removal of said head region from the interior of said slotted duct without inadvertent release of said inserted wires.

7. A method for the ready insertion of wires, within a flexible, elongated, longitudinally-slotted, wire-containing duct, at any desired location along said duct, utilizing the hand tool described in paragraph 6 above, comprising: orienting said tine-like projections of said head region, parallel to, and immediately in contact with said longitudinal slot of said duct; parting said longitudinal slot, by pushing against, and into said slot, by means of said projections; inserting said projections, along with said captured wires, within interior of said duct; further inserting said projections, such that entire said head region enters the interior of said duct, along with said captured wires; rotating said inserted head region to an orientation which is non-parallel with said longitudinal slot; moving said wire insertion tool in the desired direction, to continuously and progressively both enlarge adjacent regions of said slot, and thereby also spreading said duct, thereby allowing said captured wires to be inserted into said duct's interior, as said tool moves along the length of said duct.

8. A method for the ready insertion of wires, within a flexible, elongated, longitudinally-slotted, wire-containing duct, at an open end of said duct, utilizing the hand tool described in paragraph 6 above, comprising: pushing against the open end of said slotted duct with that portion of said elongated shank region immediately adjacent to said head region, thereby readily separating said slot; pushing said head region into the interior of said duct, causing said head region, said projections and said captured wires, to enter the open end of said slotted duct; moving said shank along the length of said longitudinal slot, thereby continuously and progressively enlarging adjacent regions of said duct's slot; readily inserting said captured wires, by allowing said wire to be inserted within said duct's interior, as said head region of said wire insertion tool and said captured wires are moved along said duct's interior.

BRIEF DESCRIPTION OF THE DRAWINGS

In order that the present invention may be more fully and readily understood, and, further, that all the features thereof may be better appreciated, the present invention will now be described by way of preferred examples, with reference to the accompanying drawings.

FIG. 1 is a perspective view of the preferred embodiment of the wire insertion hand tool of the present invention.

FIG. 2 is a cross-sectional view, of the preferred embodiment of the wire insertion hand tool of the present invention, taken along line 2—2, shown in FIG. 1.

FIG. 3 is a cross-sectional view, of the preferred embodiment of the wire insertion hand tool of the present invention, taken along line 3—3, shown in FIG. 1.

FIG. 4 is a cross-sectional view, of the preferred embodiment of the wire insertion hand tool of the present invention, taken along line 4—4, shown in FIG. 1.

FIG. 5 is a perspective view of the preferred embodiment of the wire insertion hand tool of the present invention, showing the operation of inserting a captured single wire, into the interior at the open end of a fragment of a flexible, elongated, longitudinally-slotted duct.

FIG. 6 is a perspective view of the preferred embodiment of the wire insertion hand tool of the present invention, shown during the operation of inserting a plurality of captured single wires, at a desired location along a length of flexible, elongated, longitudinally-slotted duct.

FIG. 7 is a 'phantom' view of the head region and shank region, of the wire insertion hand tool of the present invention, shown during the operation of orienting the head region, in relation to the access slot of the longitudinally-slotted duct, in order to accomplish ready and secure insertion of the wires captured between the projections of the head region.

DETAILED DESCRIPTION OF THE PREFERRED EMBODIMENTS OF THE PRESENT INVENTION

The advantages and utility of the present invention will be readily apparent from the following detailed description of the preferred embodiments of the present invention.

FIG. 1 is a perspective view of the preferred embodiment of the wire insertion hand tool of the present invention. The present invention is a wire insertion hand tool, depicted herein generally as 10. A generally rounded, and in this embodiment also grooved, handle region, is depicted herein as 11. The present invention preferred embodiment handle region 11, resembling in general form and dimension the handle commonly utilized on a conventional screw-driver, etc.

Mounted in, and extending from, the handle region 11, is a narrow elongated shank region, depicted herein as 12. The shank region 12, leading edges have smooth contours.

In an alternate preferred embodiment, the shank region 12, may also have incorporated therein, a telescoping extending means. The telescoping extending means is not shown herein on the drawings.

Integral to the shank region 12, and located at the area most distal to the handle region 11, is the head region, a configuration comprising a semi-circular shaped, yoke-like, configuration, depicted herein as head region 13. The head region 13, is substantially formed by two tine-like, substantially outwardly-directed projections, depicted herein as 14. The projections 14, have smooth contours on their leading-edge surfaces, and cross-sectional dimensions similar to those of the shank region 12. Each arcuate tine 14, is curved around a central point located on the longitudinal axis of shank region 12, so that each tine has a length of about ninety (90) degrees, measured around the central point. The two tines collectively have a total arcuate length of about one hundred eighty (180) degrees, so as to give head 13, a hollow, semi-circular shape, as viewed in FIG. 1.

FIG. 2 is a cross-sectional view of the preferred embodiment of the wire insertion hand tool of the present invention, taken along line 2—2, shown in FIG. 1. FIG. 2 depicts the cross-sectional configuration of one of the projections 14, of the head region 13. It is shown as being rounded, having smooth leading edge contours and surfaces, and circular in cross-sectional shape. It will also be obvious to those skilled in the art that other cross-sectional configurations, which also have smooth leading edge contours and surfaces, such as, e.g., air-foil or elliptical shapes, may also be utilized for both the projections 14, of the present invention.

FIG. 3 is a cross-sectional view of the preferred embodiment of the wire insertion hand tool of the present invention, taken along line 3—3, shown in FIG. 1. FIG. 3 depicts the cross-sectional configuration of the elongated shank region 12 as being rounded, having smooth leading edge contours and surfaces, and circular in cross-sectional shape. It will also be obvious to those skilled in the art that other cross-sectional configurations, which also have smooth leading edge contours and surfaces, such as, e.g., air-foil or elliptical shapes, may also be utilized for the shank region 12, of the present invention.

FIG. 4 is a cross-sectional view of the preferred embodiment of the wire insertion tool of the present invention, taken along line 4—4, shown in FIG. 1. FIG. 4 depicts the cross-sectional thickness of the handle region 11, with emphasis on the relative cross-sectional thinness of the elongated shank region 12. Although the preferred embodiment of the present invention is depicted herein as having a rounded, grooved handle region 11 in cross-section, similar to a screw driver, or the like, handle, it will be obvious to those skilled in the art that other handle region configurations, may also be suitable, and in certain instances, preferred.

FIG. 5 is a perspective view of the preferred embodiment of the wire insertion hand tool of the present invention, showing the operation of inserting a captured single wire, into the interior at the open end of a fragment of a flexible, elongated, longitudinally-slotted duct.

FIG. 6 is a perspective view of the preferred embodiment of the wire insertion tool of the present invention, shown during the operation of inserting a plurality of captured single wires, at a desired location along a fragment of flexible, elongated, longitudinally-slotted duct.

In the particular method of utilizing the wire insertion hand tool, as depicted in FIG. 5, the wire insertion hand tool 10, of the present invention, can be used to readily insert a single captured wire, herein depicted as 17, from one point, here the open end of a flexible, elongated, longitudinally-slotted electrical wire harness or duct, herein depicted as 15, to another desired point along the duct 15. By continued pushing or pulling of the wire insertion tool 10, depending upon the operator's position, away from the open end along the longitudinal access slot, herein depicted as 16, of the duct 15, the insertion tool 10, will draw or insert the captured wire 17, into the entire length of the interior 22, of the flexible slotted duct 15.

As shown in FIG. 5, by pushing against the open end of the slotted duct 15, with that portion of the elongated shank region 12, immediately adjacent to the head region 13, the access slot 16, readily remains spread apart. Now the entire head region 13, including the projections 14, and the enclosed or captured wire, herein depicted as 18, which is located, or 'captured', between the projections 14, can enter the open end of the longitudinally-slotted duct 15, and be inserted into the interior 22, of the duct 15.

By moving, i.e., pulling or pushing, the wire insertion tool 10 along the length of the longitudinal access slot 16, a region of the access slot 16 in the flexible duct 15, is continuously and progressively enlarged and separated. This action allows the enclosed, or captured, wire 18, located between the projections 14, to be inserted into the interior of the duct, depicted as 22, as the wire insertion tool 10 passes along the length of the duct 15.

The wire insertion tool 10, is unable to be removed from the interior 22 of the slotted duct 15, when the projections 14 of the head region 13, are not oriented parallel to the access slot 16. This feature of the invention prevents any wire 17, or other strand-like material, inserted within the interior 22 of the slotted duct 15, from inadvertently escaping from the duct's interior 22, and prevents the head region 13 from prematurely disengaging from the interior 22 of the slotted duct 15.

Additionally, using the wire insertion hand tool 10, in the particular method of operation, as depicted in FIG. 6, a plurality of single wires 19, may be inserted at any desired location along a length of flexible, elongated, longitudinally-slotted duct 15. As shown in FIG. 6, the projections 14, of the head region 13, are also designed to readily spread the interior 22 of the flexible slotted duct 15, as well as the longitudinal, elongated access slot 16, at a desired location, in order to receive the captured plurality of singles wires, herein depicted as 20, located between the projections 14.

The process of wire insertion into the duct interior 22, is then accomplished as follows. The projections 14, with the enclosed or captured plurality of single wires 20, are first positioned, so as to be parallel to, and immediately above, the access slot 16. The access slot 16, is then spread apart by inserting the projections 14 through the access slot 16, and into the duct's interior 22. Once the entire head region 13 has entered the duct's interior 22, the wire insertion tool 10 is then rotated, so that the projections 14 are no longer parallel to, but at right angles to the access slot 16.

In so doing, the captured plurality of single wires 20, can now be released into the duct's interior 22. Subsequently, the wire insertion tool 10, is removed by simply rotating it so that the projections 14, are once again oriented parallel with the access slot 16, and then withdrawing the head region 13 from the duct's interior 22.

When using the wire insertion hand tool 10, in this fashion, a captured plurality of single wires 20, may be inserted quickly, and at any desired location, along a length of flexible slotted duct 15, without concern for their inadvertent escape from the interior 22 of the slotted duct 15.

FIG. 7 is a 'phantom' view of the head region and shank region of the wire insertion hand tool of the present invention, shown during the operation of orienting the head region, in relation to the access slot of the longitudinally-slotted duct, in order to accomplish ready and secure insertion of the wires captured between the projections of the head region. By orienting the projections 14 of the head region 13 to be parallel to the access slot 16, the head region 13, with its projections 14 and captured plurality of single wires 20, may be inserted at any desired point. Upon insertion and rotation of the head region 13, to an orientation which is non-parallel to, or at right angles to, the access slot 16, the captured plurality of single wires 20, also become fully inserted within the duct's interior 22. Such wires are then lodged or inserted within the interior 22 of the slotted duct 15, and can not be inadvertently released from the interior 22 upon removal of the head region 13.

The previous detailed description of the preferred embodiments of the present invention is presented for purposes of clarity of understanding only, and no unnecessary limitations should be understood or implied therefrom, as all appropriate mechanical and functional equivalents to the above, which may be obvious to those skilled in the arts pertaining thereto, are considered encompassed within the claims of the present invention.

What is claimed is:

1. A hand tool for inserting flexible wires into a flexible duct, wherein said duct has a circular cross-section, and a longitudinal slot, extending therealong, and each wire has a diameter appreciably smaller than the diameter of the duct; said hand tool comprising a handle (11), a shank (12) extending from said handle, and a semi-circular shaped head (13), connected to said shank, remote from said handle; said shank having a longitudinal axis; said head comprising two arcuate tines (14), extending from said shank, in a common plane, containing the shank longitudinal axis; said arcuate tines extending laterally from said shank, in opposite directions, away from said shank axis, said arcuate tines being curved around a central point located on the shank longitudinal axis, such that each arcuate tine has a length of about ninety degrees measured around said central point, whereby the tines collectively define a head, having a hollow semi-circular shaped profile; said tines, having rounded end portions, spaced apart a substantially greater distance than the diameter of an individual wire to be inserted into the duct, whereby the hollow semi-circular shaped head is enabled to simultaneously, loosely capture a plurality of wires therein; said head being insertable into the circular duct by aligning the tines with the duct slot, and pushing the handle toward the duct, so that the tine rounded end portions spread the slot edges apart; said handle being turnable around the shank axis, to orient the inserted head, to a position, extending cross-wise of the duct axis; and said tool being bodily movable along the duct, so that the inserted head progressively draws the engaged sections of the individual wires, through the slot, into the duct interior space; said arcuate tines having smooth uninterrupted curved side surfaces engageable with the wires and the duct interior surfaces so that the semi-circular shaped head is enabled to slide smoothly along the wires and duct interior surfaces.

* * * * *